Feb. 3, 1931.  C. H. ZIERDT  1,790,691
VOLTAGE REGULATING APPARATUS
Filed Oct. 12, 1928
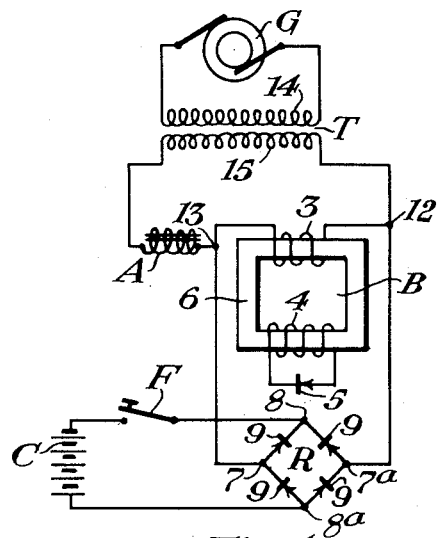
Fig.1.
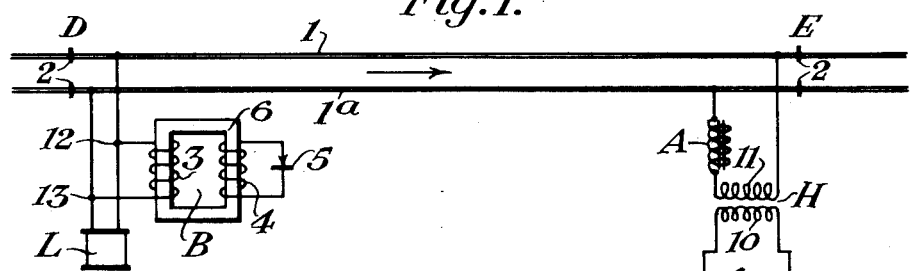
Fig.2.
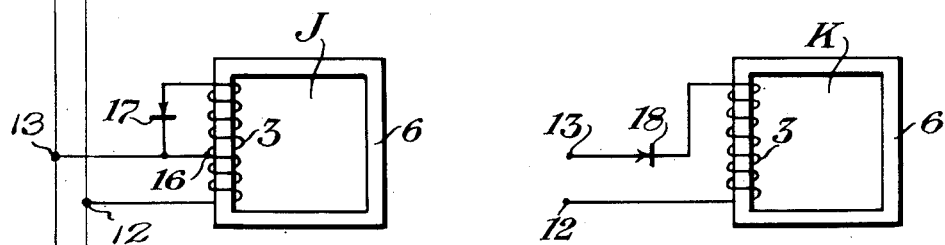
Fig.3.  Fig.4.
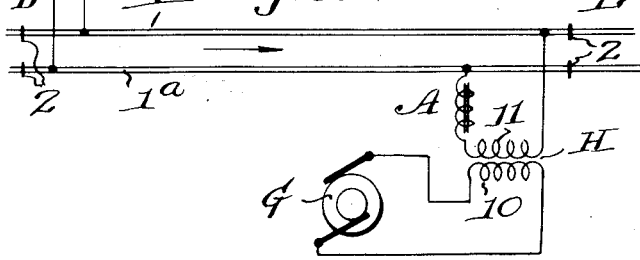
INVENTOR:
C. H. Zierdt,
by A. L. Vennell
His Attorney Patented Feb. 3, 1931

1,790,691

UNITED STATES PATENT OFFICE

CONRAD H. ZIERDT, OF ROSEDALE, PENN TOWNSHIP, ALLEGHENY COUNTY, PENNSYLVANIA, ASSIGNOR TO THE UNION SWITCH & SIGNAL COMPANY, OF SWISSVALE, PENNSYLVANIA, A CORPORATION OF PENNSYLVANIA

VOLTAGE-REGULATING APPARATUS

Application filed October 12, 1928. Serial No. 312,048.

My invention relates to voltage regulating apparatus, that is, apparatus for use between a source of energy and an energy consuming device for regulating the voltage applied to said device.

I will describe several forms of apparatus embodying my invention, and will then point out the novel features thereof in claims.

In the accompanying drawing, Fig. 1 is a diagrammatic view showing one form of voltage regulating apparatus embodying my invention applied to a storage battery charging circuit. Fig. 2 is a diagrammatic view showing one form of voltage regulating apparatus embodying my invention applied to a track circuit. Fig. 3 is a diagrammatic view showing another form of voltage regulating apparatus embodying my invention applied to a track circuit. Fig. 4 is a view showing still another form of voltage regulating apparatus embodying my invention.

Similar reference characters refer to similar parts in each of the several views.

Referring first to Fig. 1, the reference character T designates a transformer, the primary 14 of which is connected with a suitable source of alternating current here shown as an alternator G. The secondary 15 of transformer T is connected, through a current limiting impedance A, with the input terminals 7 and 7ª of a rectifier R comprising a plurality of asymmetric units 9 connected in the usual manner to provide full wave rectification. The output terminals 8 and 8ª of rectifier R are connected through a switch F with a storage battery C which is to be charged by the unidirectional current delivered by the rectifier.

With the apparatus constructed in the manner thus far described, under normal conditions, that is, when switch F is closed, current from the secondary 15 of transformer T is supplied to battery C through rectifier R, and the parts are so proportioned that this current upon flowing through the impedance A creates a potential drop in the impedance which maintains the voltage impressed across the input terminals 7 and 7ª of rectifier R at a value which is slightly higher than the terminal voltage of storage battery C. The impedance A is so constructed that its flux density in response to this normal current, is comparatively low. The reactance of A is therefore substantially constant through a wide range of variations in the current. If, now, switch F is opened, the current flowing in impedance A is greatly diminished, so that the potential drop across the impedance is also greatly diminished, and if the voltage of the secondary 15 of transformer T is constant, the voltage impressed across the input terminals of rectifier R rises. This rise in voltage in some instances may be sufficiently great to damage the rectifier R. To prevent this undesirable rise in voltage, I provide a reactor B comprising a closed iron core 6 carrying a primary winding 3 and a secondary winding 4. The terminals 12 and 13 of the primary winding 3 of reactor B are connected with the input terminals 7ª and 7, respectively of rectifier R. An asymmetric unit 5 is connected directly across the secondary winding 4 of reactor B.

It is apparent that the voltage impressed across input terminals 7ª and 7 of rectifier R is also impressed across terminals 12 and 13 of winding 3 of reactor B. An alternating current therefore flows in winding 3, and an alternating flux is set up in core 6. This alternating flux in core 6 tends to induce an alternating electromotive force in winding 4 of reactor B, but since asymmetric unit 5 is connected in series with winding 4, a unidirectional current flows in winding 4 which creates a unidirectional flux in core 6 in addition to the alternating flux created in core 6 by the alternating current in winding 3. The parts of reactor B are so proportioned that under normal conditions, that is, when switch F is closed, the flux density in the core 6 is near saturation. If, now, the voltage impressed upon rectifier R tends to rise for any reason, such as the opening of switch F, the current flowing in winding 3 of reactor B increases, so that the flux density in core 6 increases, and the impedance of winding 3 therefore decreases. Since winding 4 and rectifier 5 co-operate to create a unidirectional flux in core 6, as has already been described, the decrease in impedance of winding 3 due to a given rise in the voltage applied to its terminals is greater than would be the case if winding 4 and rectifier 5 were omitted. As a result of this decrease in the impedance of winding 3, the current through the winding is still further increased. But the increased current in winding 3 causes an increase in the potential drop across impedance A, with the final result that the voltage applied to terminals 7 and 7ª of rectifier R when switch F is opened is considerably smaller than would be the case if reactor B were not provided. By properly designing the reactor B and the impedance A, the voltage across the terminals of rectifier R may be made substantially constant.

Referring now to Fig. 2, the reference characters 1 and 1ª designate the track rails of a stretch of railway track over which traffic normally moves in the direction indicated by the arrow. These rails are divided, by means of insulated joints 2, to form a track section D—E. The section D—E is provided with a source of track circuit current, here shown as a track transformer H having its secondary 11 connected across the rails adjacent the exit end of the section. Interposed between the rail 1ª of section D—E and the secondary 11 of track transformer H is an impedance A, one function of which is to limit the output of the transformer when its terminals are short circuited by the wheels and axles of a train. The primary 10 of transformer H is constantly supplied with alternating current from a suitable source, here shown as an alternator G. Section D—E is also provided with a track relay L which is connected across the rails adjacent the entrance end of the section.

It is clear that there will be a certain amount of current leakage between the rails 1 and 1ª, and that the amount of this leakage will depend upon the resistance of the track ballast which varies with weather conditions, etc. Since the voltage at the secondary 11 of transformer T is constant, it follows that with only the apparatus thus far described, the voltage applied to the terminals of relay L would vary in response to change in ballast resistance. This variation in voltage is undesirable, and to prevent its occurrence, I connect across the terminals of relay L, the terminals 12 and 13 of the winding 3 of the reactor B shown in Fig. 1, and I so design the reactor that when normal voltage is impressed across the terminals of relay L, the core 6 of reactor B is nearly saturated by the alternating and the unidirectional fluxes in the core.

The parts in Fig. 2 are further proportioned in such manner that under the worst conditions, that is, when leakage from rail to rail is maximum, the voltage impressed across the terminals of relay L is sufficient to energize the relay. If the leakage between the rails then decreases, so that the voltage applied to relay L tends to increase, the voltage across terminals 12 and 13 of winding 3 of reactor B also tends to increase, and the current flowing in winding 3 increases for reasons previously pointed out in connection with Fig. 1. When the current in winding 3 increases, however, the potential drop in the rails and in impedance A also increases, and by properly designing reactor B, the voltage at the terminals of relay L can be held substantially constant.

Referring now to Fig. 3, the apparatus shown in this view is the same as that shown in Fig. 2, except that the reactor B is replaced by a reactor J in which winding 4 is omitted. This is made possible by tapping the winding 3 at an intermediate point 16 and by connecting an asymmetric unit 17 between this point and one end of the winding. External connections are then made to the reactor between the point 16 and the other end of the winding 3. The parts of reactor J are so proportioned, that when normal voltage is impressed across terminals 12 and 13, the alternating current which flows in the lower half of winding 3 and the unidirectional current which flows in the upper half of winding 3 magnetize the core 6 to a flux density which is near saturation. The reactor J may also be substituted for reactor B in the combination shown in Fig. 1.

In the reactor K shown in Fig. 4, an asymmetric unit 18 is connected in series with the winding 3 so that the current flowing in winding 3 is unidirectional current. The reactor K is so designed that when normal voltage is impressed across terminals 12 and 13 of winding 3, the flux density in core 6 is near saturation. I have found that with the reactor constructed in this manner, since the flux in core 6 is a unidirectional flux, the decrease in impedance in winding 3 for a given rise in voltage at terminals 12 and 13 is considerably greater than the decrease in impedance in the winding of a similar reactor not having the asymmetric unit 5 in series with the winding. This effect may further be increased by using an asymmetric unit 18 of the type comprising a copper disk having a coating of cuprous oxide formed on one side thereof. A unit of this type exhibits the characteristic of decreasing its resistance with increases in the electromotive force applied across the unit. The reactor K may be substituted for reactor B in either Figs. 1 or 2, and when so used, the apparatus as a whole functions in the manner previously described in connection with these views.

Although I have herein shown and described only a few forms of voltage regulating apparatus embodying my invention, it is understood that various changes and modifications may be made therein within the scope of the appended claims without departing from the spirit and scope of my invention.

Having thus described my invention, what I claim is:

1. The combination, with a source of alternating current connected with a load and an impedance interposed between the two, of an iron core reactor having a portion of its winding connected in multiple with said load and receiving current from said source, and an asymmetric unit connected in series with the remaining portion of said winding for causing a unidirectional current to flow in said remaining portion, the parts of said reactor being so proportioned that when normal voltage is impressed across the first portion of said winding the flux density in said core due to the current in both portions of said winding is near saturation.

2. Voltage regulating apparatus comprising a reactor having an iron core provided with a winding, and an asymmetric unit connected in series with a portion of said winding, the parts of said reactor being so proportioned that when normal voltage is impressed across the remaining portion of said winding the flux density of said core due to the current in both portions of said winding is near saturation.

3. In combination, a stretch of railway track, a source of alternating current connected with the rails of said stretch, an impedance interposed between said source and a track rail, a relay connected with the rails of said stretch, an iron core reactor having a portion of its winding connected in multiple with said relay, and an asymmetric unit connected in series with the remaining portion of said winding for causing a unidirectional current to flow in said remaining portion, the parts of said reactor being so proportioned that when normal voltage is impressed across the first portion of said winding the flux density in said core due to the current in both portions of said winding is near saturation.

In testimony whereof I affix my signature.

CONRAD H. ZIERDT.